United States Patent
Restrepo et al.

(10) Patent No.: US 11,791,061 B2
(45) Date of Patent: Oct. 17, 2023

(54) CONDUCTIVE HIGH STRENGTH EXTRUDABLE ULTRA HIGH MOLECULAR WEIGHT POLYMER GRAPHENE OXIDE COMPOSITE

(71) Applicant: Asbury Graphite of North Carolina, Inc., Lumberton, NC (US)

(72) Inventors: David Restrepo, Orlando, FL (US); Alessandro Bernardi, Philadelphia, PA (US); Kevin Herrington, Philadelphia, PA (US); Matthew McInnis, Orlando, FL (US); Jeff Bullington, Orlando, FL (US)

(73) Assignee: Asbury Graphite North Carolina, Inc., Lumberton, NC (US)

( * ) Notice: Subject to any disclaimer, the term of this patent is extended or adjusted under 35 U.S.C. 154(b) by 167 days.

(21) Appl. No.: 17/012,913

(22) Filed: Sep. 4, 2020

(65) Prior Publication Data

US 2021/0082598 A1    Mar. 18, 2021

Related U.S. Application Data

(60) Provisional application No. 62/899,396, filed on Sep. 12, 2019.

(51) Int. Cl.
*H01B 1/24* (2006.01)
*C08K 3/04* (2006.01)
(Continued)

(52) U.S. Cl.
CPC ............... *H01B 1/24* (2013.01); *B29B 9/06* (2013.01); *B29B 9/12* (2013.01); *B29B 9/16* (2013.01);
(Continued)

(58) Field of Classification Search
CPC .... C04B 20/1066; C01B 32/198; C08K 3/042
See application file for complete search history.

(56) References Cited

U.S. PATENT DOCUMENTS

| | | |
|---|---|---|
| 2,459,520 A | 1/1949 | Greenshields |
| 4,046,863 A | 9/1977 | Kobayashi et al. |

(Continued)

FOREIGN PATENT DOCUMENTS

| | | |
|---|---|---|
| CN | 101462889 | 6/2009 |
| CN | 102021633 | 4/2011 |

(Continued)

OTHER PUBLICATIONS

Extended European Search Report for EP 19862892.7 dated Oct. 12, 2021, 11 pp.

(Continued)

*Primary Examiner* — Khanh T Nguyen
(74) *Attorney, Agent, or Firm* — Edwin S. Flores; Chalker Flores, LLP

(57) ABSTRACT

The present invention includes an injection moldable/extrudable composite that preserves at least 80% or enhances the primary physical properties of compression molded polymer, the composite comprising, e.g., an Ultra High Molecular Weight Polyethylene (UHMWPE) and graphene/graphite oxide or graphene oxide, with or without polypropylene.

18 Claims, 5 Drawing Sheets

(51) Int. Cl.
   *C08J 3/20*    (2006.01)
   *B29B 9/12*    (2006.01)
   *B29B 9/16*    (2006.01)
   *B29B 9/06*    (2006.01)
   B29K 509/00    (2006.01)
   B29K 23/00     (2006.01)
   B29K 105/16    (2006.01)

(52) U.S. Cl.
   CPC .......... *C08J 3/203* (2013.01); *C08K 3/04* (2013.01); *C08K 3/042* (2017.05); *B29B 2009/163* (2013.01); *B29K 2023/0683* (2013.01); *B29K 2023/12* (2013.01); *B29K 2105/16* (2013.01); *B29K 2509/00* (2013.01); *C08K 2201/001* (2013.01); *C08K 2201/005* (2013.01); *C08K 2201/011* (2013.01)

(56) References Cited

U.S. PATENT DOCUMENTS

| | | |
|---|---|---|
| 5,057,370 A | 10/1991 | Krieg et al. |
| 5,360,582 A | 11/1994 | Boyd et al. |
| 5,501,934 A | 3/1996 | Sukata et al. |
| 5,506,061 A | 4/1996 | Kindl et al. |
| 5,509,993 A | 4/1996 | Hirschvogel |
| 5,583,176 A | 12/1996 | Haberle |
| 5,883,176 A | 3/1999 | Gerroir et al. |
| 6,004,712 A | 12/1999 | Barbetta et al. |
| 6,172,163 B1 | 1/2001 | Rein et al. |
| 6,348,279 B1 | 2/2002 | Saito et al. |
| 6,436,567 B1 | 8/2002 | Saito et al. |
| 7,005,205 B1 | 2/2006 | Gyoten et al. |
| 7,231,084 B2 | 6/2007 | Tang et al. |
| 7,329,698 B2 | 2/2008 | Noguchi et al. |
| 7,623,340 B1 | 11/2009 | Song et al. |
| 8,168,964 B2 | 5/2012 | Hiura et al. |
| 8,216,541 B2 | 7/2012 | Jang et al. |
| 8,580,132 B2 | 11/2013 | Lin et al. |
| 9,758,379 B2 | 9/2017 | Blair |
| 9,802,206 B2 | 10/2017 | Kitaura et al. |
| 10,138,969 B2 | 11/2018 | Hattori et al. |
| 10,287,167 B2 | 5/2019 | Blair |
| 2002/0008031 A1 | 1/2002 | Barsukov et al. |
| 2002/0119358 A1 | 8/2002 | Rock |
| 2002/0182387 A1 | 12/2002 | Mercuri et al. |
| 2004/0000735 A1 | 1/2004 | Gilbert, Sr. et al. |
| 2004/0033189 A1 | 2/2004 | Kaschak et al. |
| 2004/0071896 A1 | 4/2004 | Kang |
| 2004/0209150 A1 | 10/2004 | Rock et al. |
| 2005/0041373 A1 | 2/2005 | Pruss |
| 2005/0191471 A1 | 9/2005 | Haggquist |
| 2005/0196636 A1 | 9/2005 | Kawakami et al. |
| 2005/0208319 A1 | 9/2005 | Finley et al. |
| 2007/0219336 A1 | 9/2007 | Ito |
| 2007/0284557 A1 | 12/2007 | Grunner et al. |
| 2008/0048152 A1 | 2/2008 | Jang et al. |
| 2008/0206124 A1 | 8/2008 | Jang et al. |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0224420 A1 | 9/2009 | Wilkinson |
| 2009/0241496 A1 | 10/2009 | Pintault et al. |
| 2010/0006445 A1 | 1/2010 | Tomantschger |
| 2010/0028681 A1 | 2/2010 | Dai et al. |
| 2010/0055025 A1 | 3/2010 | Jang et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |
| 2010/0317790 A1 | 12/2010 | Jang et al. |
| 2011/0017585 A1 | 1/2011 | Zhamu et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 | 5/2011 | Chung et al. |
| 2011/0143018 A1 | 6/2011 | Peng et al. |
| 2011/0143107 A1 | 6/2011 | Steinig-Nowakowski |
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0065309 A1 | 3/2012 | Agrawal et al. |
| 2012/0077017 A1 | 3/2012 | Buresch |
| 2012/0107562 A1 | 5/2012 | Bolotin et al. |
| 2012/0129736 A1 | 5/2012 | Tour et al. |
| 2012/0184065 A1 | 7/2012 | Gharib et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0264041 A1 | 10/2013 | Zhamu et al. |
| 2013/0272950 A1 | 10/2013 | Yun et al. |
| 2013/0330833 A1 | 12/2013 | Ruiz et al. |
| 2014/0018480 A1 | 1/2014 | Lee et al. |
| 2014/0030590 A1 | 1/2014 | Wang et al. |
| 2014/0117745 A1 | 5/2014 | Wilke et al. |
| 2014/0134092 A1 | 5/2014 | Shankman |
| 2014/0272199 A1 | 9/2014 | Lin et al. |
| 2014/0299475 A1 | 10/2014 | Bullington et al. |
| 2015/0266739 A1 | 9/2015 | Zhamu et al. |
| 2015/0284253 A1 | 10/2015 | Zhamu et al. |
| 2015/0368436 A1 | 12/2015 | Chiu et al. |
| 2016/0016803 A1 | 1/2016 | Stoltz et al. |
| 2016/0083552 A1 | 3/2016 | Nosker et al. |
| 2016/0144339 A1 | 5/2016 | Kim et al. |
| 2016/0216629 A1 | 7/2016 | Grinwald |
| 2017/0166722 A1 | 6/2017 | Zhamu et al. |
| 2017/0233290 A1 | 8/2017 | Christiansen et al. |
| 2018/0086643 A1* | 3/2018 | Christiansen ....... C04B 20/1066 |
| 2019/0051903 A1 | 2/2019 | Manabe et al. |

FOREIGN PATENT DOCUMENTS

| | | |
|---|---|---|
| CN | 102586952 | 7/2012 |
| CN | 102719719 | 7/2012 |
| CN | 103058541 | 4/2013 |
| CN | 103130436 | 6/2013 |
| CN | 103215693 | 7/2013 |
| CN | 103408880 | 11/2013 |
| CN | 103545536 | 1/2014 |
| CN | 10356997 A | 2/2014 |
| CN | 103757823 | 4/2014 |
| CN | 103819915 | 4/2014 |
| CN | 103962102 | 8/2014 |
| CN | 104319372 | 1/2015 |
| CN | 104446176 | 3/2015 |
| CN | 104844930 | 4/2015 |
| CN | 106700356 | 5/2017 |
| CN | 107446221 A * | 12/2017 ............ C08J 3/215 |
| CN | 108276576 | 7/2018 |
| EP | 0949704 | 10/1999 |
| EP | 1227531 | 7/2002 |

(56) References Cited

FOREIGN PATENT DOCUMENTS

| | | | | |
|---|---|---|---|---|
| EP | 2560228 | 2/2013 | | |
| GB | 723598 | 2/1955 | | |
| JP | S6169853 A | 4/1986 | | |
| JP | 64-009808 | 1/1989 | | |
| JP | 2012-007224 | 1/2012 | | |
| JP | 2012-136597 | 7/2012 | | |
| KR | 20110119429 | 11/2011 | | |
| KR | 20130048741 | 4/2013 | | |
| KR | 20130090979 | 8/2013 | | |
| KR | 20150026092 | 3/2015 | | |
| KR | 1020170019802 | 2/2017 | | |
| RU | 2456361 | 7/2012 | | |
| WO | 2009032069 | 3/2009 | | |
| WO | 2009059193 | 5/2009 | | |
| WO | 2010089326 | 8/2010 | | |
| WO | 2010091352 | 8/2010 | | |
| WO | 2011014242 | 2/2011 | | |
| WO | 2011074125 | 6/2011 | | |
| WO | 2011078639 | 6/2011 | | |
| WO | 2011086391 | 7/2011 | | |
| WO | 2011087301 | 7/2011 | | |
| WO | 2011099761 | 8/2011 | | |
| WO | 2011162727 | 12/2011 | | |
| WO | 2012058553 | 5/2012 | | |
| WO | 2012148880 | 11/2012 | | |
| WO | 2012177864 | 12/2012 | | |
| WO | 2013001266 | 4/2013 | | |
| WO | 2013096990 | 7/2013 | | |
| WO | 2014062226 | 4/2014 | | |
| WO | 2014080144 | 5/2014 | | |
| WO | 2014104446 | 7/2014 | | |
| WO | 2014138587 | 9/2014 | | |
| WO | 2014210584 | 12/2014 | | |
| WO | WO 2016005504 | * | 1/2016 | ............ C08J 3/00 |
| WO | 2016154057 | 9/2016 | | |

OTHER PUBLICATIONS

Osicka, et al., "Light-Induced and Sensing Capabilities of SI-ATRP Modified Graphene Oxide particles in Elastomeric Matrix," Active and Passive Smart Structures and Integrated Systems 2017, vol. 10164, 1016434, doi: 10.1117/12.2260703, 10.pp.

Wang, Y., et al., "Kevlar oligomer functionalized graphene for polymer composites," Polymer, 52, Jun. 15, 2011, 3661-3670.

Academic Press Dictionary of Science and Technology ("Flake", p. 1, obtained online Aug. 19, 2016).

Babak, F., et al., "Preparation and Mechanical Properties of Graphene Oxide: Cement Nanocomposites," The Scientific World Journal, vol. 2014, ID 276323, 10 pp.

Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.

Ebinezar, et al., "Analysis of hardness test for aluminum carbon nanotube metal matrix and graphene," Indian Journal of Engineering, vol. 10, No. 21, 2014, pp. 33-39.

Extended European Search Report for EP 12844344.7 dated Oct. 22, 2015, 8 pp.

Extended European Search Report for EP 14759787.6 dated Oct. 6, 2016, 13 pp.

Extended European Search Report for EP 14760912.7 dated Dec. 6, 2016, 8 pp.

Extended European Search Report for EP 15834377.2 dated Mar. 9, 2018, 8 pp.

Extended European Search Report for EP 16765526.5 dated Feb. 13, 2018, 7 pp.

Extended European Search Report for EP 16769452.0 dated Mar. 1, 2018, 9 pp.

Extended European Search Report for EP 16780450.9 dated Apr. 19, 2018, 17 pp.

Extended European Search Report for EP 16780450.9 dated Jul. 13, 2018, 18 pp.

Extended European Search Report for EP 16849382.3 dated Apr. 30, 2019, 10 pp.

Extended European Search Report for EP 17185605.7 dated Nov. 29, 2017, 7 pp.

Extended European Search Report for EP 17865997.5 dated Jul. 22, 2019, 7 pp.

Fang, M., et al., "Covalent polymer functionalization of graphene nanosheets and mechanical properties of composites" Journal of Materials Chemistry, 2009, vol. 19, No. 38, pp. 7098-7105.

Feng, H., et al., "A low-temperature method to produce highly reduced graphene oxide," Nature Communications, Feb. 26, 2013, 8 pp.

FMC, Persulfates Technical Information, (http://ww.peroxychem.com/media/90826/aod_brochure_persulfate.pdf, downloaded on Jan. 19, 2017) 16 pp.

Herman, A., et al., "Bipolar plates for PEM fuel cells: a review." International Journal of Hydrogen Energy, 2005, vol. 30, No. 12, pp. 1297-1302.

Hwang, T., et al., "One-step metal electroplating and patterning on a plastic substrate using an electrically-conductive layer of few-layer graphene," Carbon, Sep. 17, 2011, vol. 50, No. 2, pp. 612-621.

International Search Report and Written Opinion for PCT/US2012/061457 from KIPO dated Mar. 15, 2013, 10 pp.

International Search Report and Written Opinion for PCT/US2014/021765 from KIPO dated Jul. 24, 2014, 11 pp.

International Search Report and Written Opinion for PCT/US2014/021810 from KIPO dated Jul. 14, 2014, 10 pp.

International Search Report and Written Opinion for PCT/US2014/062371 from KIPO dated Feb. 11, 2015, 12 pp.

International Search Report and Written Opinion for PCT/US2015/045657 from KIPO dated Oct. 27, 2015, 6 pp.

International Search Report and Written Opinion for PCT/US2015/049398 from KIPO dated Dec. 16, 2015, 13 pp.

International Search Report and Written Opinion for PCT/US2016/014873 from KIPO dated May 13, 2016, 15 pp.

International Search Report and Written Opinion for PCT/US2016/022229 from KIPO dated Jun. 27, 2016, 15 pp.

International Search Report and Written Opinion for PCT/US2016/023273 from KIPO dated Jul. 12, 2016.

International Search Report and Written Opinion for PCT/US2016/023435 from KIPO dated May 30, 2016, 13 pp.

International Search Report and Written Opinion for PCT/US2016/025307 from KIPO dated Sep. 12, 2016, 11 pp.

International Search Report and Written Opinion for PCT/US2016/025338 from KIPO dated Jul. 25, 2016, 12 pp.

International Search Report and Written Opinion for PCT/US2016/052292 from KIPO dated Nov. 21, 2016, 14 pp.

International Search Report and Written Opinion for PCT/US2017/027231 from KIPO dated Jul. 11, 2017, 18 pp.

International Search Report and Written Opinion for PCT/US2017/058512 from KIPO dated Feb. 7, 2018, 14 pp.

International Search Report and Written Opinion for PCT/US2019/051405 from KIPO dated Jan. 3, 2020, 11 pp.

Jeon, I., et al., "Edge-carboxylated graphene nanosheets via ball milling." Proceedings of the National Academy of Sciences of the United States of America PNAS, Apr. 10, 2012, vol. 109, No. 15, pp. 5588-5593.

Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.

Kaur, S., et al., "Enhanced thermal transport at covalently functionalized carbon nanotube array interfaces," Nature Communications, Jan. 22, 2014, pp. 1-8.

Kirschner, M., "Ozone," Ullmann's Encyclopedia of Industrial Chemistry, vol. 25, 2012, pp. 637-644.

Li, Y., et al., "Hybridizing wood cellulose and graphene oxide toward high-performance fibers," NPG Asia Materials, 7, Jan. 9, 2015, 14 pp.

Liu, Y. B., et al., "Recent development in the fabrication of metal matrix-particulate composites using powder metallurgy techniques," Journal of Materials Science, vol. 29, No. 8, 1994, pp. 1999-2007.

(56) References Cited

OTHER PUBLICATIONS

Maguire, J. A., et al., "Efficient low-temperature thermal functionalization of alkanes. Transfer dehydrogenation catalized by Rh(PMe3)2CI(CO) in solution under a high-pressure hydrogen atmosphere," J. Am. Chem. Soc., Aug. 1, 1991, vol. 113:17, pp. 6706-6708.
McQuarrie (2011, General Chemistry (4th Edition). University Science Books, Appendix G Standard Reduction Voltages for Aqueous Solutions at 25C, p. A-34 to A-37 and also p. 949, Table 25.3. Online version available at: http://app.knovel.com/hotlinkltoc/id:kpGCE00013/general-chemistry-4th/general-chemistry-4th).
Merriam-Webster ("Definition of Flake" p. 1-9, obtained online Aug. 19, 2016).
Minus, M., et al., "The Processing, Properties, and Structure of Carbon Fibers," JOM, Feb. 2005, pp. 52-58.
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and Al2O3 particulate composites by powder metallurgy technique," Materials Letters, 2002, vol. 53, No. 4, pp. 244-249.
Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.
Ong, T. S., et al, "Effect of atmosphere on the mechanical milling of natural graphite," Carbon, 2000, vol. 38, No. 15, pp. 2077-285.
Pauling, L., General Chemistry, Chapter 15, "Oxidation-Reduction Reactions Electrolysis," Dover Publications, Inc., 1970, 41 pp.
Polymers: A Properties Database, "Poly(ethylene terphthalate)", Chemnetbase, downloaded from http://poly.chemnetbase.com, Jan. 24, 2016, 5 pp.
Porter, Roger S. et al., "Property Opportunities with Polyolefins, A Review Preparations and Applications of High Stiffness and Strength by Uniaxial Draw," Polymer, 35:23, 1994, pp. 4979-4984.
Rafiee, M. et al., "Fracture and fatigue in graphene nanocomposites." Small, 2010, vol. 6, No. 2, pp. 179-183.
Rahman, M.A., et al., "The effect of residence time on the physical characteristics of PAN-based fibers produced using a solvent-free coagulation process," Materials Science and Engineering A 448, 2007, pp. 275-280.
Steurer, P., et al., "Functionalized graphenes and thermoplastic nanocomposites based upon expanded graphite oxide." Macromolecular Rapid Communications, 2009, vol. 30, Nos. 1-5, pp. 316-327.
Szabo, T., et al., "Evolution of Surface Functional Groups in a Series of Progressively Oxidized Graphite Oxides," Chem. Mater., vol. 18, Mar. 29, 2006, pp. 2740-2749.
Taeseon, H., et al., "One-step metal electroplating and patterning on a plastic substrate using an electrically conductive layer of few-layer graphene," Carbon, Elsevier, Oxford, GB, vol. 50, No. 2, Sep. 8, 2011, pp. 312-621.
Tissera, N., et al., "Hydrophobic cotton textile surfaces using an amphiphilic graphene oxide (GO) coating," Applied Surface Science, 324, Nov. 4, 2014 (2015), pp. 455-463.
USP Technologies, "What is the pH of H2O2 solutions?," http://www.h2o2.com/faqs/FaqDetail.aspx?fId=26, accessed Jan. 19, 2017, 2 pp.
Wang, Q., et al., "Nanostructures and Surface Nanomechanical Properties of Polyacrylonitrile/Graphene Oxide Composite Nanofibers by Electrospinning," J. Appl. Polym. Sci., 2013.
Wang, X. et al., "In situ polymerization of graphene nanosheets and polyurethane with enhanced mechanical and thermal properties." Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Q., et al., "Suprecapacitors Based on Flexible Graphene/Polyaniline Nanofiber Composite Films," ACS Nano (2010), 4(4):1963-1970.
Wu, Z.-S. et al., "Field Emission of Single-Layer Films Prepared by Electrophoretic Deposition." Advanced Materials, 21, 2009, pp. 1756-1760.
Xia, et al., "Effects of resin content and preparing conditions on the properties of polyphenylene sulfide resin/graphite composite for bipolar plate," Journal of Power Sources, vol. 178, Dec. 5, 2007, pp. 363-367.
Zhao, W., et al., "Preparation of graphene by exfoliation of graphite using wet ball milling." Journal of Materials Chemistry, Jun. 3, 2010, vol. 20, pp. 5817-5819.
Chemical Book, <<https://www.chemicalbook.com/ChemicalProductProperty_EN_CB8295389.htm>>, year 2017.
Chemical Book, <<https://www.chemicalbook.com/ProductChemical PropertiesCB8123794_EN.htm>>, year 2017.
Gong, et al., "Optimization of the Reinforcement of Polymer-Based Nanocomposites with Graphene," ECCM15-15th European Conference on Composite Materials, Venice, Italy, Jun. 24-28, 2012.
Gulotty, R., et al., "Effects of Functionalization on Thermal Properties of Single-Wall and Multi-Wall Carbon Nanotube—Polymer Nancomposites," UC Riverside—Polytechnic of Turin (2013), 25 pp.
Song, M., et al., "The Effect of Surface Functionalization on the Immobilization of Gold Nanoparticles on Graphene Sheets," Journal of Nanotechnology, vol. 2012, Art. ID 329318, Mar. 28, 2012, 5 pp.
Zheng, H., et al., "Graphene oxide-poly (urea-formaldehyde) composites for corrosion protection of mild steel," Corrosion Science, Apr. 27, 2018, 139, pp. 1-12.

\* cited by examiner

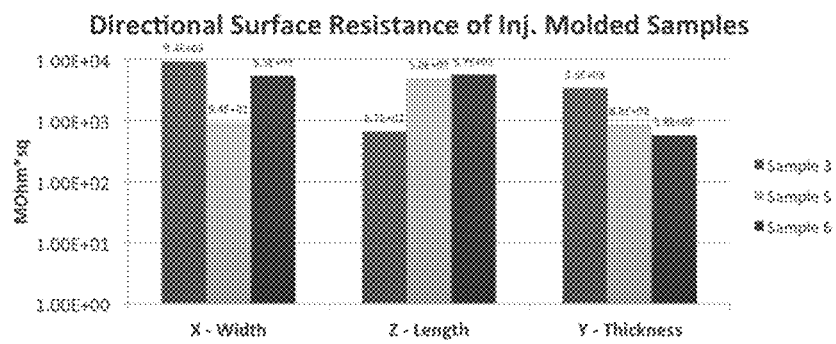

FIG. 5

| | Property | Units | Standard | PP (A034) | UHMWPE3040 | UHMWPE + 10% pp + 1% EOGO | UHMWPE + 10% pp + 1.5% EOGO | UHMWPE + 10% pp + 2% EOGO | UHMWPE + 10% pp + 5% EOGO |
|---|---|---|---|---|---|---|---|---|---|
| | Eletrical Resistivity | | | 1.70E+16 | 1.40E+16 | 6.10E+10 | 2.56E+10 | 5.18E+09 | |
| | HDT ASTM | °C | D648 | 98.8 | | 61.4 | 60.3 | 64.3 | |
| Injection molded | Izod injection molded bars | ft-lb/in | ASTM D256 | 0.862 | na | Non-Break | Non-Break | Non-Break | Non-Break |
| | Yield Stress | Mpa | ASTM D638 | 35.35 | na | 22.4 | 22 | 22.4 | 23.6 |
| | Elongation @ Yield | % | ASTM D638 | 9.2 | na | 23.7 | 23.7 | 23.3 | 18.7 |
| | Break Stress | Mpa | ASTM D638 | 17.65 | na | 15.5 | 16.5 | 16.4 | 12.6 |
| | Thermal Conductivity | W/(m K) | | | 0.19 | 0.288 | | 0.323 | 0.335 |
| Compression molded | Sand Slurry Relative abrasion index | | | 941 | 100 | 270 | 174 | 186 | |
| | Static COF | | | | 0.29 | 0.31 | 0.29 | 0.3 | |
| | Stdev | | | | 0.04 | 0.02 | 0.02 | 0.01 | |
| | Kinetic COF | | D 1894 | 0.23 | 0.09 | 0.23 | 0.22 | 0.24 | |
| | IZOD Impact double notch | ft-lb/in | ASTM D256 | | Non-break | | | | |
| | Yield Stress | Mpa | ASTM D638 UTEC | | 19 | 21 | 21 | 21.1 | |
| | Elongation @ Yield | % | ASTM D638 UTEC | | 9.9 | 17.4 | 17.9 | 17.2 | |

FIG. 6

CONDUCTIVE HIGH STRENGTH EXTRUDABLE ULTRA HIGH MOLECULAR WEIGHT POLYMER GRAPHENE OXIDE COMPOSITE

CROSS-REFERENCE TO RELATED APPLICATIONS

This application claims priority to U.S. Provisional Application Ser. No. 62/899,396, filed Sep. 12, 2019, the entire contents of which are incorporated herein by reference.

TECHNICAL FIELD OF THE INVENTION

The present invention relates in general to the field of conductive high strength extrudable ultra high molecular weight polymer-graphene oxide composites.

STATEMENT OF FEDERALLY FUNDED RESEARCH

None.

BACKGROUND OF THE INVENTION

Without limiting the scope of the invention, its background is described in connection with high molecular weight polyethylene, as an example.

It is commonly known that Ultra High Molecular Weight Polyethylene (UHMWPE) does not flow under pressure and temperature, as such, it cannot be processed using an extruding or injection molding processes. UHMWPE is a linear high-density polyethylene (HDPE) with a molecular mass in the range of between $1 \times 10^6$ g/mol to $16 \times 10^6$ g/mol. UHMWPE has exceptional impact strength and abrasion resistance as well as special processing characteristics. These unusual properties eliminate its use in conventional extrusion and injection molding techniques. The inability to be processed using injection or extrusion has restricted UHMWPE to be used in the creation of fibers or in complex architectures/structures that require extrusion based processing techniques.

The only viable processing technique for UHMWPE is compression molding of a part that can then be machined into a part such as a gear or a hip replacement. A version of UHMWPE that could be processed using the lower cost high volume production technique of injection molding is needed, but unavailable. The only technique used to make an UHMWPE fiber is to dissolve the UHMWPE in a solvent such as mineral oil. The dissolved UHMWPE can be pulled partially through a process fiber drying/compression process. The desire for a lower cost high volume production technique led to the development of a blended composite of UHMWPE and with a flow-assisting polymer (polypropylene), which has been successfully demonstrated in the prior art.

Unfortunately, injection molding required the use polypropylene as a flow additive. The resulting extruded UHMWPE/polypropylene composite demonstrated dramatically worse mechanical properties compared to either the compression molded UHMWPE material or compression molded UHMWPE/polypropylene. As a result of the poor mechanical performance, the injection molded UHMWPE/polypropylene composite has no market.

What is needed are novel additives for use with UHMWPE that can be extruded without a loss in mechanical strength.

SUMMARY OF THE INVENTION

In one embodiment, the present invention includes an injection moldable/extrudable composite that preserves at least 80% or enhances the primary physical properties of compression molded polymer, the composite comprising a non-extrudable or poorly-extrudable polymer and graphene/graphite oxide or graphene oxide. In one aspect, the composite further comprises polypropylene. In another aspect, the non-extrudable or poorly-extrudable polymer is selected from olefin fibers, Ultra High Molecular Weight Polyethylene (UHMWPE), cross-linked polyethylene (PEX), high-density polyethylene (HDPE), linear low-density polyethylene (LLDPE), low-density polyethylene (LDPE), medium-density polyethylene (MDPE), para-aramid fibers, and/or polyoxazole fibers. In another aspect, the physical properties of a compression molded UHMWPE, and a resistivity less than 1011 Ohm-cm. In another aspect, the UHMWPE has a molecular weight between 500,000 and 16,000,000 Daltons. In another aspect, the UHMWPE has a molecular weight between 2,000,000 and 8,000,000 Daltons. In another aspect, the composite has a graphene oxide between 0.01 weight percent (wt %) and 20 wt % relative to UHMWPE. In another aspect, the composite has a graphene oxide between 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, or 10 wt % relative to UHMWPE. In another aspect, the composite has a polypropylene loading is between 0.1 wt % and 20 wt % relative to UHMWPE. In another aspect, the graphene/graphite oxide are graphene/graphite oxide flakes with a surface area to thickness ratio greater than 300 Angstroms, and thickness of less than 160 Angstroms, wherein the graphene flakes have no significant physical surface distortions, no significant epoxy functionalization, and have an oxidation level greater than 0.5% by mass. In another aspect, at least one of: a mechanical, an electrical, or a thermal physical property of the polymer is enhanced or sustained with the addition of the graphene/graphite oxide or graphene oxide when compared to the polymer without the graphene/graphite oxide or graphene oxide. In another aspect, at least 95% of the graphene/graphite oxide are flakes with a thickness of about 0.8 to 20 nanometers. In another aspect, the polymer is a UHMWPE in a powder with a particle size between 15 µm and 1,000 µm. In another aspect, the polypropylene is a powder and has a particle size between 100 µm and 2,500 µm.

In another embodiment, the present invention includes a method of making a non-extrudable or poorly-extrudable polymer/graphene (G) and/or graphene oxide (GO) composite that is extrudable and injection moldable and preserves or enhances at least one mechanical, electrical, or thermal physical property relative to a compression molded version of non-extrudable or poorly-extrudable polymer/GO composite comprising: mixing a powder or pellets of the non-extrudable or poorly-extrudable polymer with between 0.01 wt % and 20 wt % graphene and/or graphene oxide under conditions in which the polymer powder or pellets and the graphene and/or graphene oxide are substantially mixed. In one aspect, the composite further comprises polypropylene. In another aspect, the non-extrudable or poorly-extrudable polymer is selected from olefin fibers, Ultra High Molecular Weight Polyethylene (UHMWPE), cross-linked polyethylene (PEX), high-density polyethylene (HDPE), linear low-density polyethylene (LLDPE), low-density polyethylene (LDPE), medium-density polyethylene (MDPE), para-aramid fibers, and/or polyoxazole fibers. In another aspect, the physical properties of a compression molded non-extrudable or poorly-extrudable polymer comprises a resistivity less than 1011 Ohm-cm. In another aspect, the non-extrudable or poorly-extrudable polymer is UHMWPE with a molecular weight between 500,000 and 16,000,000 Daltons. In another aspect, the non-extrudable or poorly-extrudable polymer is UHMWPE with a molecular weight between 2,000,000 and 8,000,000 Daltons. In another aspect, the composite has a graphene oxide between 0.01 weight percent (wt %) and 20 wt % relative to UHMWPE. In another aspect, the composite has a graphene oxide between 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, or 10 wt % relative to UHMWPE. In another aspect, the graphene/graphite oxide are graphene/graphite oxide flakes with a surface area to thickness ratio greater than 300 Angstroms, and thickness of less than 160 Angstroms, wherein the graphene flakes have no significant physical surface distortions, no significant epoxy functionalization, and have an oxidation level greater than 0.5% by mass. In another aspect, at least 95% of the graphene/graphite oxide are flakes with a thickness of about 0.8 to 20 nanometers. In another aspect, the polymer is a UHMWPE in a powder with a particle size between 15 μm and 1,000 μm. In another aspect, the composite has a polypropylene loading is between 0.1 wt % and 20 wt % relative to UHMWPE. In another aspect, the polypropylene is a powder and has a particle size between 100 μm and 2,500 μm. In another aspect, the method further comprises heating a UHMWPE/GO/PP composite during the mixing step. In another aspect, the method further comprises coating a UHMWPE powder with graphene or graphite oxide by combining the UHMWPE powder and the graphene or graphite oxide powder in a high shear mixer for more than 1 minutes and less than 60 minutes. In another aspect, the method further comprises adding a polypropylene powder to a graphene or graphite oxide coated UHMWPE powder and combining in a high shear mixer for more than 1 minutes and less than 60 minutes. In another aspect, the method further comprises placing a UHMWPE/GO/PP powder mix into an extruder to produce pellets for use in injection molding. In another aspect, the method further comprises extruding the composite in a cylinder at a temperature between 200° C. to 250° C.; with a melt temperature between 180° C. and 400° C. preferable 200° C. and 240° C.; and a screw speed between 60 to 300 rpm. In another aspect, at least one of a mechanical, electrical, or thermal physical property of the cementitious composite is enhanced with the addition of the graphene/graphite oxide. In another aspect, at least 95% of the graphene/graphite oxide flakes have a surface area to thickness ratio of a minimum of 300 Angstroms. In another aspect, the graphene/graphite oxide flake has primarily edge oxidation. In another aspect, the method further comprises obtaining graphene/graphite oxide flakes formed in a stirred media mill, and the stirred media mill is an Attrition mill or ball mill.

In another embodiment, the present invention includes a method of making a non-extrudable or poorly-extrudable polymer/graphene (G) and/or graphene oxide (GO) composite comprising: mixing a powder or pellets of the non-extrudable or poorly-extrudable polymer with between 0.01 wt % and 20 wt % graphene and/or graphene oxide under conditions in which the polymer powder or pellets and the graphene and/or graphene oxide are substantially mixed; and extruding or injection molding the composite into a shape, wherein the extrudable and injection moldable and preserves or enhances at least one mechanical, electrical, or thermal physical property relative to a compression molded version of non-extrudable or poorly-extrudable polymer/GO composite.

In another embodiment, the present invention includes an injection moldable/extrudable composite that preserves at least 80% or enhances the primary physical properties of compression molded polymer, the composite comprising an Ultra High Molecular Weight Polyethylene (UHMWPE) and graphene/graphite oxide or graphene oxide. In one aspect, the composite further comprises polypropylene. In another aspect, the physical properties of a compression molded UHMWPE, and a resistivity less than 1011 Ohm-cm. In another aspect, the UHMWPE has a molecular weight between 500,000 and 16,000,000 Daltons. In another aspect, the UHMWPE has a molecular weight between 2,000,000 and 8,000,000 Daltons. In another aspect, the composite has a graphene oxide between 0.01 weight percent (wt %) and 20 wt % relative to UHMWPE. In another aspect, the composite has a graphene oxide between 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, or 10 wt % relative to UHMWPE. In another aspect, the composite has a polypropylene loading is between 0.1 wt % and 20 wt % relative to UHMWPE. In another aspect, the graphene/graphite oxide are graphene/graphite oxide flakes with a surface area to thickness ratio greater than 300 Angstroms, and thickness of less than 160 Angstroms, wherein the graphene flakes have no significant physical surface distortions, no significant epoxy functionalization, and have an oxidation level greater than 0.5% by mass.

BRIEF DESCRIPTION OF THE DRAWINGS

For a more complete understanding of the features and advantages of the present invention, reference is now made to the detailed description of the invention along with the accompanying figures and in which:

FIG. 5 shows the isotropic volume resistance of UHWMPE/Polypropylene/GO composites.

FIG. 6 shows the technical data for a large number of parameters comparing compression molded verses injection molded UHMWPE/GO/PP composite.

DETAILED DESCRIPTION OF THE INVENTION

Figure 1:
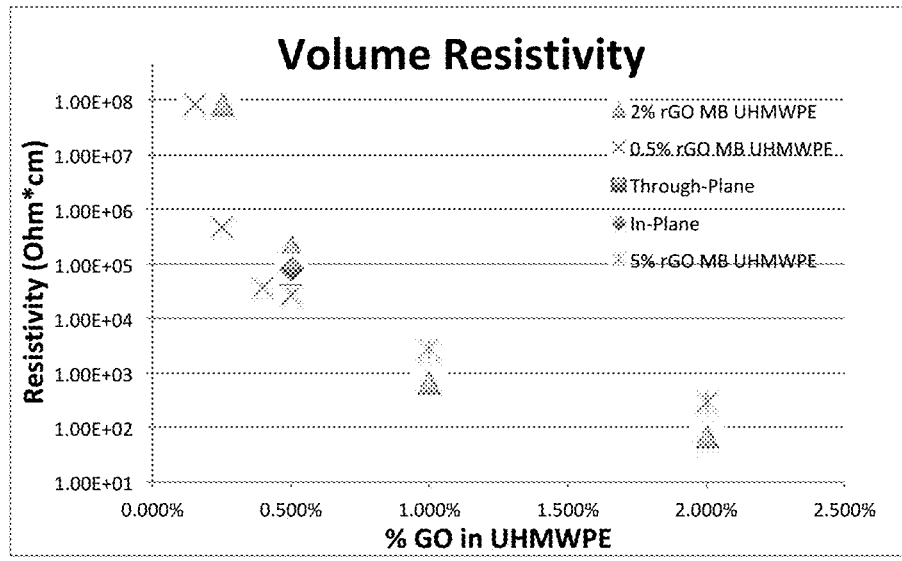
FIG. 1 shows the volume resistivities of UHMWPE/GO composites as a function of GO loading.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

Without limiting the scope of the invention, its background is described in connection with materials in the form of an extrudable UHMWPE/graphene, UHMWPE/graphene and graphene oxide, UHMWPE/polypropylene/graphene, or UHMWPE/polypropylene/graphene oxide composite to form an extrudable composite with enhanced physical properties including mechanical, electrical, thermal and RF shielding properties and enhanced UV stability/resistance relative to compression molded UHMWPE, UHMWPE/polypropylene or UHMWPE/polypropylene/Graphene Oxide composite. The GO additive improves the composite's physical performance, lifetime and stability from UV-induced damage and reduction of mechanical properties. Non-extrudable, or poorly-extrudable, polymers for use with the present invention include: olefin fibers, Ultra High Molecular Weight Polyethylene (UHMWPE), cross-linked polyethylene (PEX), high-density polyethylene (HDPE), linear low-density polyethylene (LLDPE), low-density polyethylene (LDPE), medium-density polyethylene (MDPE), para-aramid fibers, and/or polyoxazole fibers.

As used herein, the term "graphene" refers to a polycyclic aromatic molecule with carbon atoms covalently bonded to each other. The covalently bonded carbon atoms can form a six-member ring as a repeating unit, and may also include at least one of a five-member ring and a seven-member ring. Multiple graphene layers are referred to in the art as graphite. Thus, graphene may be a single layer, or also may comprise a multiple layers of graphene that are stacked on other layers of graphene. Generally, graphene will have a maximum thickness of about 100 nanometers (nm), specifically about 10 nm to about 90 nm, more specifically about 20 nm to about 80 nm.

As used herein, the term "graphene flake" refers to a "crystalline" or "flake" form of graphene that includes many graphene sheets stacked together.

Graphene can be oxidized by a number of processes including thermal, chemical or chemical-mechanical. Reduction of graphite oxide monolayer films by hydrazine, annealing in argon/hydrogen was reported to yield graphene films of low quality. Graphene can be produced in significant quantities from microcrystalline graphite that is treated with a mixture of acids such as sulfuric, nitric, and other oxidizing chemical in combination mechanical and/or thermal energy elements. This processing will produce graphene flakes ranging from a few nanometers to tens of microns depending and the specific processing environment. If one uses a mill in conjunction with an oxidizing agent the dwell time in the mill will determine the size of the flake of graphene. In general, the longer the processing time in the mill the smaller the graphene flake. The oxidizing process produces a carboxyl group on the perimeter of the graphene flake. The resulting graphene flakes can be on the order of 5 Å in thickness and can be suspended in a number of solvents with a dielectric constant greater than 32. These include, but are not limited to N-methylpyrrolidone, acetonitrile, dimethyl sulfoxide, propylene carbonate, water, and formamide.

Using strong oxidizers such as sulfuric and nitric acids result in a graphene oxide with texturing and folding of the individual sheets/flakes and the loss of carboxylic group functionality. The products of this synthesis technique are graphite/graphene oxide. Separating the strong oxidizer reactants from the products is a time consuming and expensive process. The graphene/graphite oxide, without the strong oxidizers, has an oxygen content ranging between 1 and 50 wt %. Graphite/Graphene oxide contains oxygen attached to the layers as both epoxy bridges and hydroxyl groups (—COOH). The oxidized graphene/graphite is hydrophilic. Analyses show that the graphene particle/flake is fully oxidized with —COOH groups along the edges.

Production of graphene oxides requires the use of oxidizing agent in conjunction with mechanical energy (milling). Mechanical processing can be energy efficient and prevents the decomposition of the chemical functionalities that can occur during thermal processing. Oxidizing agents can either be aqueous or non-aqueous graphene/graphite. Published literature had identified urea hydrogen peroxide adduct (UHPA) for use in solvent free and non-aqueous chemical reactions as a solid source of hydrogen peroxide. UHPA provides a basis for anhydrous, solid delivery system for $H_2O_2$.

Oxidized graphene can be produced in a wide number of mechanical milling apparatus that create the necessary mechanical energy. The current device being used is an attrition mill or Attritor. The Attritor is a grinding mill containing internally agitated media such as balls, cylinders or pebbles. It has been generically referred to as a "stirred ball mill." There are quite a few types of Attritors; which can be categorized as dry grind Attritors, wet grind Attritors, regular speed Attritors, and high speed Attritors.

One such method is taught in U.S. Pat. No. 10,297,167, issued to Blair, with relevant portions incorporated herein by reference. This inventor found that for efficient oxidation of graphene into graphene oxide requires, fine grinding, in which both impact action and shearing force are required. When wet grinding in the Attritor as the balls (media) in their random movement are spinning in different rotation and, therefore, exerting shearing forces on the adjacent slurry. As a result, both liquid shearing force and media impact force are present. Such combined shearing and impact results in size reduction as well as good dispersion.

As used herein, the term "graphene", "graphene oxide", and/or "reduced graphene oxide flakes" (G/GO/rGO flakes) refers to any combination of one or more of the following: G, GO, and rGO, that is/are modified in accordance to the present invention. For example, when the G/GO/rGO is modified to match the chemistry of a host material, the present invention refers to a modification that will make it chemically compatible for distribution of the G/GO/rGO in the host, interaction with the host (dispersion or distribution), chemical binding to the host (covalent and non-covalent), it can be functionalized by, e.g., addition of a carboxylate group by thermal treatment or with chemical functionalization that is tailored to the hydrophobicity and/or create a functional group that is compatible with the chemistry of the host (e.g., polarity, hydrophobicity, etc.).

Functionalizing the G/GO/rGO flake additive with a similar chemistry to the host allows the G/GO/rGO flake additive to be directly incorporated in the long or short range ordering or bonding. Non-limiting examples of functional groups that can be added to the G/GO/rGO flakes include, but are not limited to, alkyl, alkenyl, alkynyl, phenyl, halo, hydroxyl, carbonyl, aldehyde, carbonate, carboxylate, carboxyl, ester, methoxy, hydroperoxy, ether, hemiacetal or hemiketal, acetal, ketal, orthoester, amide, amine, imine, imide, azide, azo, cyanate, nitrile, nitrite, nitro, nitroso, oxime, pyridine, thiol, sulfide, disulfide, sulfoxide, sulfone, sulfinic, thiocyanate, phosphine, phosphonic, phosphate, and/or bonoric.

It was found that the enhancement and/or preservation of mechanical properties by including GO in the composite includes, but is not limited to: wear, friction, tensile strength, compressive strength, and flexural strengths. The composite was prepared with an appropriate proportion of components required to achieve the desired physical properties. It is found that by changing the component amounts of the composite, significant improvements of the physical properties were achieved. Solid-solid mixing can be accomplished using a high-speed/high shear mixer including, but not limited to, ball mills or Henschel mixers.

Solid-Solid mixing is a common and proven way to blend powders in solids handling polymer and material processing industries. For decades, solid-solid mixing has been used in powder blending to homogenize bulk materials and has been designed to handle materials with various bulk solids properties. On the basis of the practical experience gained with these different machines, engineering knowledge has been developed to construct reliable equipment and to predict scale-up and mixing behavior. Today the same mixing technologies are used for many more applications to: improve product quality, coat particles, fuse materials, wet or disperse in liquid, deagglomerate particles, and alter the material properties.

Polypropylene is a partially crystalline, non-polar polymer. Polypropylene properties are slightly harder and more heat resistant than polyethylene. The addition of graphene to Polypropylene can induce and modify its crystallinity. This has been reported by a number of researchers including Kai Yang in "The thermo-mechanical response of PP nanocomposites at high graphene loading." Published in ISSN: 2055-0324 (Print) 2055-0332 (Online) Journal homepage: www.tandfonline.com/loi/ynan20". The crystallization of polymers is a process associated with partial alignment of their molecular chains. These chains fold together and form ordered regions called lamellae. This has been more recently referred to as polymeric templating at the basal plane of graphene or graphene oxide. This has been shown in many articles including "A simple route to enhance the interface between graphite oxide nanoplatelets and a semi-crystalline polymer for stress transfer" by Dongyu Cai and Mo Song Published 14 Jul. 2009. In general the templating increases the crystallization and glass transition temperature and can produce a secondary phase in a polymer. Polymers can crystallize upon cooling from the melt, or from mechanical stretching or solvent evaporation. The crystal phase will affect the optical, mechanical, thermal and chemical properties of the polymer.

The templating or nucleation starts with small, nanometer-sized areas as a result of heat and the presence of impurities. Apart from the thermal mechanism, nucleation is strongly affected by impurities and fillers in the polymer. The growth of the crystalline regions preferably occurs in the direction of the largest temperature gradient unless influenced by a templating mechanism that seeds the growth and orientation of the crystallization growth. The templating mechanism can occur when the polymer chains interact with the regular electric fields from the graphene lattice structure that mirror the van der Waals forces. The interaction strength depends on the distance between the parallel chain segments and the lattice.

The present invention provide novels composite of materials and method to produce an extrudable, injection moldable UHMWPE/polyolefin/Graphene Oxide composite that enhances and/or maintains the physical properties and performance from the neat compression molded UHMWPE. The present invention also provides novel composite of materials and method to produce an extrudable, injection moldable UHMWPE/Graphene Oxide composite that enhances and/or maintains the physical properties and performance from the neat compression molded UHMWPE. Further, the present invention provides novel composite of materials and method to produce an extrudable, injection moldable UHMWPE/polyolefin/graphene or Graphene Oxide composite that enhances and/or maintains the physical properties and performance from the neat compression molded UHMWPE.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. The invention relates to an extrudable UHMWPE/polyolefin/Graphene Oxide composite that enhances or sustains the physical properties post extrusion, where the polyolefin is selected for evaluation is either polyethylene or polypropylene.

According to the present invention, the composite of the UHMWPE is a commercially available product produced by Braskem with a particle size that ranges from 25 µm to 750 µm in diameter but preferably 200 µm in diameter. The UHMWPE comprises 60% to 95% of the polymeric constituents of the final composite preferable 95% of the final composite. Where the UHMWPE can have a molecular weight between $1 \times 10^6$ g/mol and $16 \times 10^6$ g/mol preferably above $3 \times 10^6$ g/mol and most preferably in the range of $5 \times 10^6$ g/mol to $9 \times 10^6$ g/mol.

According to the present invention, the graphene oxide is a commercially available product from Garmor. The graphene flakes have a surface area to thickness ratio greater than 300 Angstroms, wherein the graphene flakes have no significant physical surface distortions and have a surface polarity, preparing a polar or nonpolar fluid having the same polarity as said graphene flakes, suspending said graphene flakes in said fluid by mixing until the suspension is substantially uniform.

In one example, 95% of the graphene oxide flakes are from about 0.1 to 100 nanometers in thickness; 95% of the flakes have a surface area to thickness ratio of a minimum of 300 Angstroms; the maximum dimension of the flakes between 220 Angstroms and 100 microns; the Graphene flake has only edge oxidation; the flake surface has the same polarity as the bonding host; the mechanically exfoliating graphite into graphene flakes in done in a stirred media mill; that produces substantially flat graphene flakes.

The method herein enables the dispersion/compounding/coating of UHMWPE polymer powder and a flow assisting polymer powder coated with a conductive additive such as graphite, carbon black and/or graphene oxide that results in a material that can be extruded, stamped, or compression molded. The coated polymer particles can be either UHMWPE polymer particles or flow assisting polymer particles or both. These polymer powders are coated with conductive material or multiple conductive components using a ball mil. The coated surface of the material creates conductive connective pathways through the volume of the final composite structure. By controlling the ratio of the components, one can achieve low density, high electrical conductivity, and surface hardness required for mass processing by extrusion, stamping, compression molding, or other similar mass manufacturing processes.

The present invention blends an extrudable polymer, at a low mass ratio to a nonextrudable polymer, where the nonextrudable polymer (UHMWP), such as polyethylene, that is coated with an additive that enhances or sustains the physical properties. The first polymer acts as a flow agent. The flow agent enables the non-flowable polymer to be extruded and when combined with the reinforcing additive enhances or sustains physical properties through the extrusion process. The blended composite polymers maintains or increases the general mechanical, tribological and other physical properties of the first polymer (UHMWPE) as long as the mass percent of the non-flowable polymer is at least 55% to 97% of blended composite polymers but preferably 90% of the polymer materials. In addition, the reinforcement additive may also be a conductive element while enhancing and/or maintaining the other physical properties (mechanical, electrical and thermal). The conductive reinforcement additive is graphene oxide at a mass ratio between 0.01% and 20% but often between 1% and 8%. The addition the three elements can be combined with a small amount of a polymeric softening agent (mineral oil) to facilitate interdiffusion of polymeric chain/crystal structure across the particle boundaries when it is exposed to elevated temperature and pressure in the extrusion process. The amount of the polymeric softening agent ranged from 0.05% to 10% by weight, for example, 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, 10 wt %, 11 wt %, 12 wt %, 13 wt %, 14 wt %, 15, wt %, 16 wt %, 17 wt %, 18 wt %, 19 wt %, or 20 wt % GO relative to UHMWPE. The ratio of non-flowable polymer to conductive reinforcement additive to polymeric softening agent can be 97%, 2% and 1% respectively. The composite may also have a polypropylene loading between 0.1 wt % and 20 wt % relative to UHMWPE, but often, 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, 10 wt %, 11 wt %, 12 wt %, 13 wt %, 14 wt %, 15, wt %, 16 wt %, 17 wt %, 18 wt %, 19 wt %, or 20 wt % polypropylene.

Figure 7:
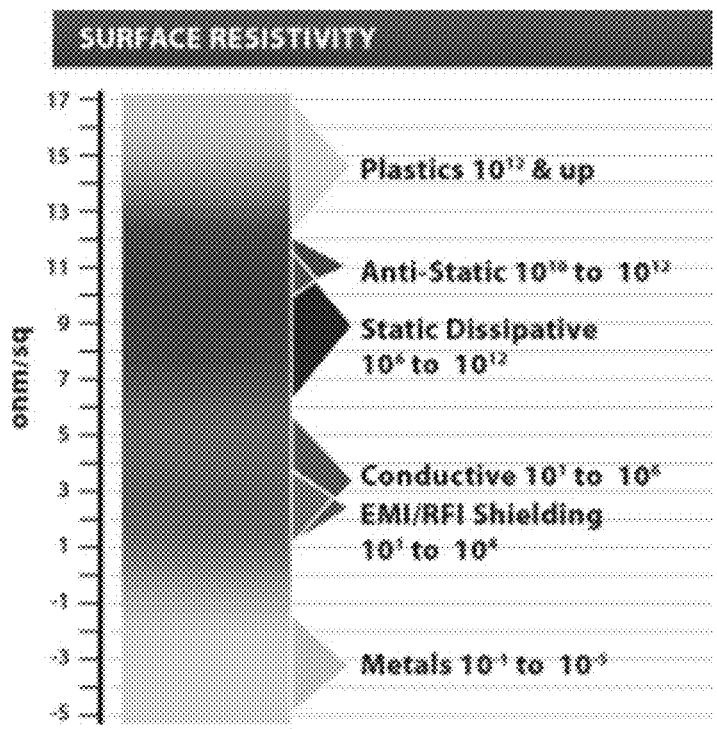
FIG. 7 shows the range of surface resistivity verses applications.

Graphite, graphene oxide, carbon nanotubes/nanofibers, and carbon black are collectively known as conductive reinforcement additives. The non-flowable polymer is, in one example, UHMWPE. UHMWPE is generally known for having the following characteristics: electrically insulating properties; low mechanical friction; low wear, high strength and being biocompatible. However, UHMWPE does not form a liquid phase that flows when exposed to temperatures and pressures making it non-extrudable. The UHMWPE particles can be subjected to mechanochemical processing in what is generically referred to as a "ball mill". The ball mill process effectively coats particles between 25 µm and 750 µm with a conductive reinforcement additive. Traditional milling media composed of stainless steel can be used but alternative media such as nylon media can also be used to prevent damage to the polymer. The damage to the polymer powder can range from the deformation of the particles, reducing the flowability of the powder, to scission of the polymer chain. As an example stainless steel media with ⅜" diameter used in the attrition mill at 500 rpm at 30 min of mixing will severely damage the polymer powder, whereas stainless steel media with ⅜" diameter used in the attrition mill at 400 rpm or less at 6 min of mixing show little to no damage to the polymeric powder. The less dense the media the greater the range one can have in terms of speed and time of the compounding process without damaging the polymeric powder. The UHMWPE used has a molecular weight between $1 \times 10^6$ g/mol and $16 \times 10^6$ g/mol preferably above $3 \times 10^6$ g/mol and most preferably in the range of $5 \times 10^6$ g/mol to $9 \times 10^6$ g/mol and a particle size greater than or equal to 20 µm. A 25 gal ball mill uses 20.1 kg of 10 mm diameter media where the density of the media is approximately 1.14 g/cm$^3$. When grinding in the ball mill, the balls (media) in their random movement are rolling against each other and the container, exerting shearing forces on the conductive material onto the UHMWPE particles. The resulting UHMWPE particles are coated on the exterior and have not been melted or mechanically distorted. The process results in coated polymer powder with unique properties and a bulk density less than 1.75 g/cm$^3$, electrical conductivity greater than 20 S/cm and Rockwell hardness >60. The coated UHMWPE particles are then blended with polypropylene powder. The polypropylene powder can have a particle size ranging from 40 µm to 750 µm in diameter, preferably 50 µm diameter. The polypropylene powder is then blended with the GO coated UHMWPE particle using a paddle mill or other similar process. The blended powders are then stored in a dry environment as the GO coating can absorb up to 4% of their weight in water from humidity. If necessary dry the powder at 80° C. for twelve (12) hours in desiccant dry air. The dry GO coated UHMWPE and polypropylene powders are placed into a standard hopper to feed an extruder. Test samples of processed GO/UHMWPE/PP were used to determine the approximate temperature and pressure a single screw extruder would require for processing. The GO/UHMWPE/PP blended powder was successfully extruded using with a single screw extruder with: (1) A cylinder temperature between 200° C. to 250° C.; (2) A melt temperature between 230° C. and 300° C.; (3) A screw speed between 60 to 125 rpm and (4) A back-pressure of 550 psi. Published results show similar trends of extruding GO loaded polymers experiencing an increase in the back-pressure as a function of the loading of graphene oxide or other additives. These processing differences are due to the addition of the GO on the UHWMPE and clearly indicate the presence of a different polymeric system in the extruder especially when compared with neat UHMWPE/PP blended powder. It is well known in the literature that coated polymeric particles will retain the coating during a compression molding process forming veins of coating. If these veins are filled with a conductive additive it results in high electrical and thermal conductivities, high reflectivity/absorption/conductivity in the RF and UV. However, the researchers have shown that these veins survived both the extrusion process and injection molding process. Unexpectedly the veins from the reinforcing conductive additive survived the extrusion and injection molding processes and act as a nucleation sites for addition crystallization of polypropylene. This can be compared to published work where PE/Polypropylene/Carbon Black shows a loss in the physical properties and the lack of continuous veins in the final composite. The additional crystalline structure in the UHMWPE/Polypropylene/GO creates a three dimensional web of higher strength polypropylene through the composite. The GO provides enhancement and/or retention of the physical properties in the extruded composite that are similar to the compression molded composite. As can be seen in the table in FIG. 6, the UHMWPE/Polypropylene/GO extruded composite passed the Izod impact test. The Izod impact test was accomplished using an ASTM standard method of determining the impact resistance of materials in the UHMWPE/Polypropylene/GO Extruded composite. The Izod impact test uses a pivoting arm that is raised to a specific height (constant potential energy) and then released. The arm swings down hitting a notched sample, breaking the specimen. The energy absorbed by the sample is calculated from the height the arm swings to after hitting the sample. A notched sample is generally used to determine impact energy and notch sensitivity. The UHMWPE/Polypropylene/GO also showed an increase in the yield stress, elongation to yield and comparable wear (see table in FIG. 6). FIG. 6 also shows the current electrical performance as a function of loading of GO by weight. In FIG. 7 one can see the target applications as a function of resistivity. The loading of 2% and 5% by weight shows the UHMWPE/Polypropylene/GO composites can be used in electrostatic dissipative (ESD) and antistatic at higher conductive loadings or by leveraging off of reflective/absorptive structures to be applicable to EMI and RF shielding as can be seen in FIG. 6 and FIG. 7. FIG. 6 shows RF blue tooth data as a cellphone is moved in and out of an injection-molded box. The injection-molded box can be seen in FIG. 7. The theoretical model for sub-percolation threshold for RF shielding is described in the article "Microwave Absorption and EMI Shielding Behavior of Nano composites Based on Intrinsically Conducting Polymers, Graphene and Carbon Nanotubes" by Parveen Saini and Manju Arora. The present invention includes a highly conductive strong percolative network with a coating of GO on the UHMWPE powder prior to creating the composite.

Figure 2:
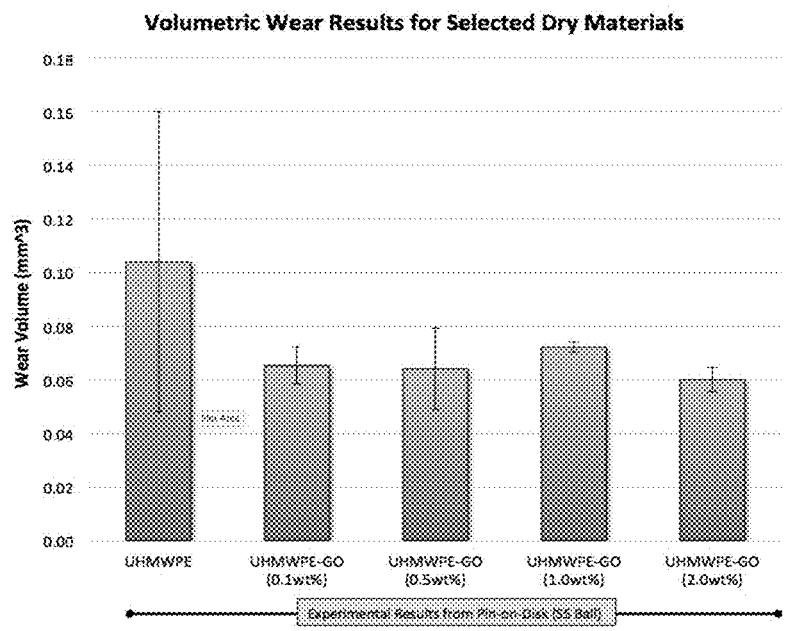
FIG. 2 shows the wear volume of a UHMWPE/GO composites as a function of GO loading.
Figure 3:
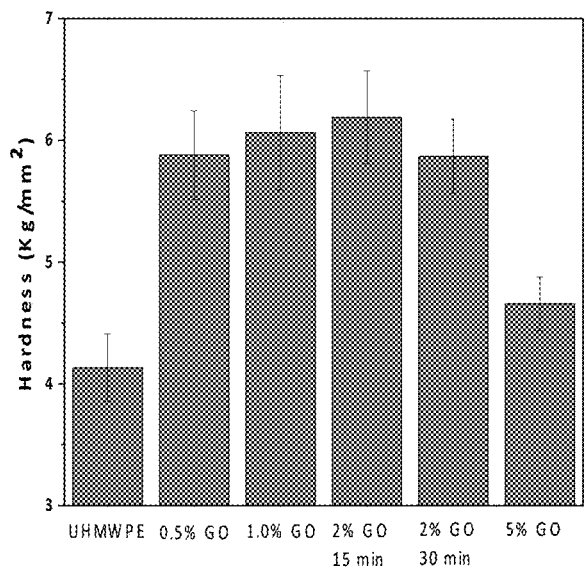
FIG. 3 shows the hardness of UHMWPE/GO composites as a function of GO loading.
Figure 4:
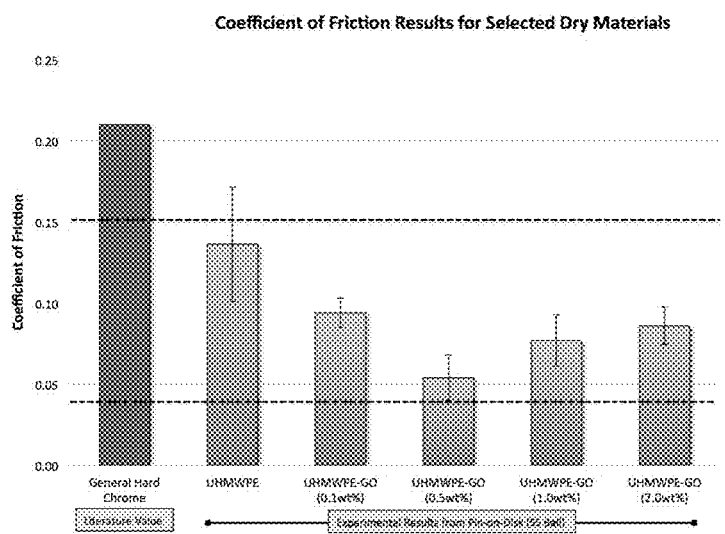
FIG. 4 shows the coefficient of friction for UHMWPE/GO composites as a function of GO loading.

FIG. 1 is a graph that shows the volume resistivities of UHMWPE/GO composites as a function of GO loading. FIG. 2 is a graph that shows the wear volume of a UHMWPE/GO composites as a function of GO loading. FIG. 3 is a graph that shows the hardness of UHMWPE/GO composites as a function of GO loading. FIG. 4 is a graph that shows the coefficient of friction for UHMWPE/GO composites as a function of GO loading. FIG. 5 is a graph that shows the isotropic volume resistance of UHWMPE/Polypropylene/GO composites. FIG. 6 shows the technical data for a large number of parameters comparing compression molded verses injection molded UHMWPE/GO/PP composite.

Figure 8:
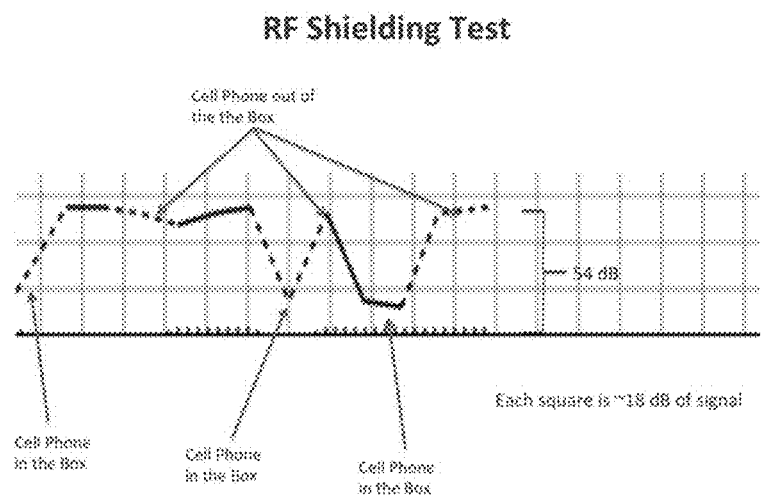
FIG. 8 shows a Bluetooth signal from a cell phone being placed in and out of an injection molded UHWMPE/Polypropylene/GO composite box.

FIG. 7 is a graph that shows the range of surface resistivity verses applications. FIG. 8 is a graph that shows a Bluetooth signal from a cell phone being placed in and out of an injection molded UHWMPE/Polypropylene/GO composite box.

Figure 9:
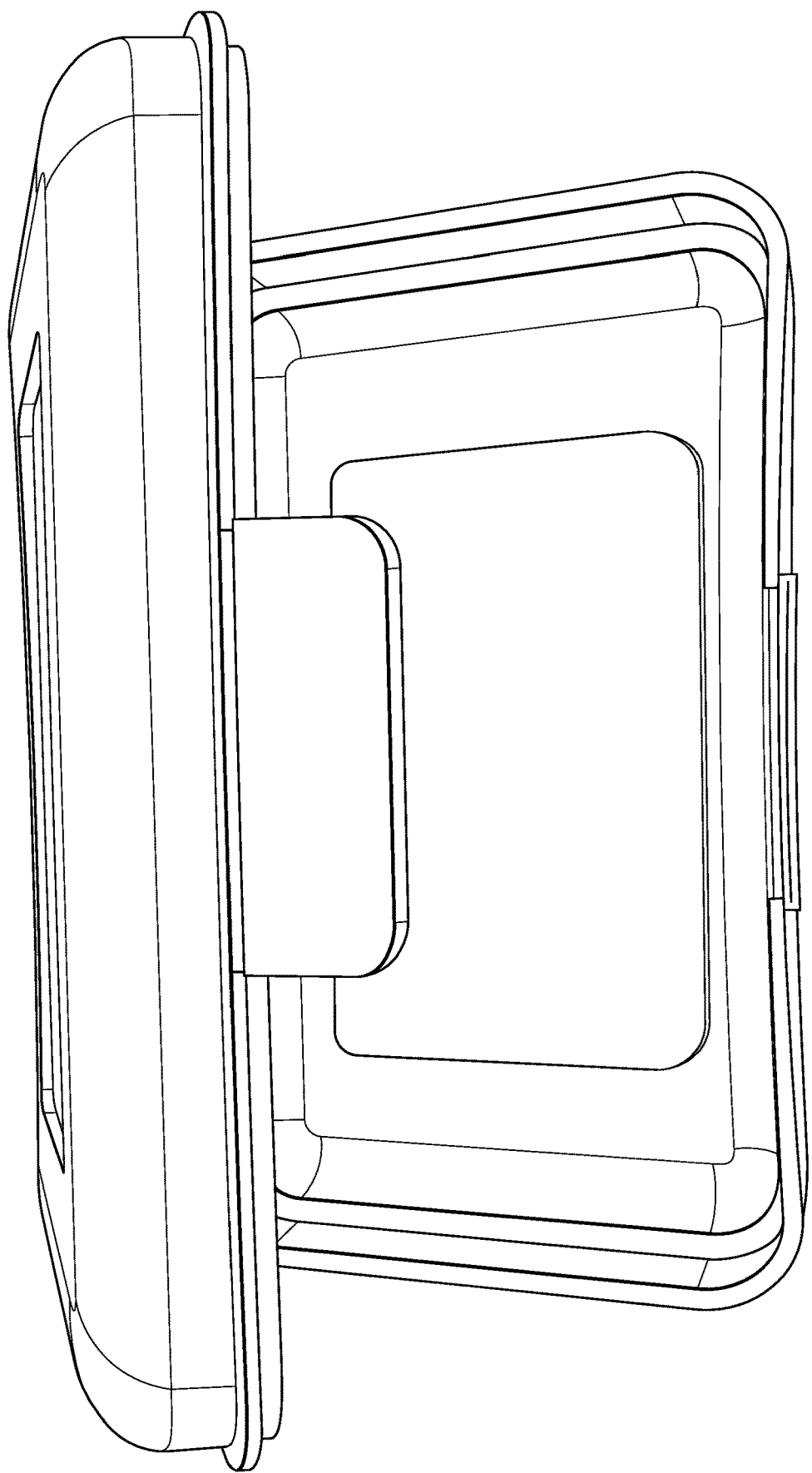
FIG. 9 shows the injection molded UHWMPE/Polypropylene/GO composite box.

FIG. 9 shows the injection molded UHWMPE/Polypropylene/GO composite box.

In one embodiment, the present invention includes an injection moldable/extrudable composite that preserves at least 80% or enhances the primary physical properties of compression molded polymer, the composite comprising a non-extrudable or poorly-extrudable polymer and graphene/graphite oxide or graphene oxide. In one aspect, the composite further comprises polypropylene. In another aspect, the non-extrudable or poorly-extrudable polymer is selected from olefin fibers, Ultra High Molecular Weight Polyethylene (UHMWPE), cross-linked polyethylene (PEX), high-density polyethylene (HDPE), linear low-density polyethylene (LLDPE), low-density polyethylene (LDPE), medium-density polyethylene (MDPE), para-aramid fibers, and/or polyoxazole fibers. In another aspect, the physical properties of a compression molded UHMWPE, and a resistivity less than 1011 Ohm-cm. In another aspect, the UHMWPE has a molecular weight between 500,000 and 16,000,000 Daltons. In another aspect, the UHMWPE has a molecular weight between 2,000,000 and 8,000,000 Daltons. In another aspect, the composite has a graphene oxide between 0.01 weight percent (wt %) and 20 wt % relative to UHMWPE. In another aspect, the composite has a graphene oxide between 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, or 10 wt % relative to UHMWPE. In another aspect, the composite has a polypropylene loading is between 0.1 wt % and 20 wt % relative to UHMWPE. In another aspect, the graphene/graphite oxide are graphene/graphite oxide flakes with a surface area to thickness ratio greater than 300 Angstroms, and thickness of less than 160 Angstroms, wherein the graphene flakes have no significant physical surface distortions, no significant epoxy functionalization, and have an oxidation level greater than 0.5% by mass. In another aspect, at least one of: a mechanical, an electrical, or a thermal physical property of the polymer is enhanced or sustained with the addition of the graphene/graphite oxide or graphene oxide when compared to the polymer without the graphene/graphite oxide or graphene oxide. In another aspect, at least 95% of the graphene/graphite oxide are flakes with a thickness of about 0.8 to 20 nanometers. In another aspect, the polymer is a UHMWPE in a powder with a particle size between 15 µm and 1,000 µm. In another aspect, the polypropylene is a powder and has a particle size between 100 µm and 2,500 µm.

In another embodiment, the present invention includes a method of making a non-extrudable or poorly-extrudable polymer/graphene (G) and/or graphene oxide (GO) composite that is extrudable and injection moldable and preserves or enhances at least one mechanical, electrical, or thermal physical property relative to a compression molded version of non-extrudable or poorly-extrudable polymer/GO composite that consists essentially of, or consists of: mixing a powder or pellets of the non-extrudable or poorly-extrudable polymer with between 0.01 wt % and 20 wt % graphene and/or graphene oxide under conditions in which the polymer powder or pellets and the graphene and/or graphene oxide are substantially mixed. In one aspect, the composite further comprises polypropylene. In another aspect, the non-extrudable or poorly-extrudable polymer is selected from olefin fibers, Ultra High Molecular Weight Polyethylene (UHMWPE), cross-linked polyethylene (PEX), high-density polyethylene (HDPE), linear low-density polyethylene (LLDPE), low-density polyethylene (LDPE), medium-density polyethylene (MDPE), para-aramid fibers, and/or polyoxazole fibers. In another aspect, the physical properties of a compression molded non-extrudable or poorly-extrudable polymer comprises a resistivity less than 1011 Ohm-cm. In another aspect, the non-extrudable or poorly-extrudable polymer is UHMWPE with a molecular weight between 500,000 and 16,000,000 Daltons. In another aspect, the non-extrudable or poorly-extrudable polymer is UHMWPE with a molecular weight between 2,000,000 and 8,000,000 Daltons. In another aspect, the composite has a graphene oxide between 0.01 weight percent (wt %) and 20 wt % relative to UHMWPE. In another aspect, the composite has a graphene oxide between 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, or 10 wt % relative to UHMWPE. In another aspect, the graphene/graphite oxide are graphene/graphite oxide flakes with a surface area to thickness ratio greater than 300 Angstroms, and thickness of less than 160 Angstroms, wherein the graphene flakes have no significant physical surface distortions, no significant epoxy functionalization, and have an oxidation level greater than 0.5% by mass. In another aspect, at least 95% of the graphene/graphite oxide are flakes with a thickness of about 0.8 to 20 nanometers. In another aspect, the polymer is a UHMWPE in a powder with a particle size between 15 μm and 1,000 μm. In another aspect, the composite has a polypropylene loading is between 0.1 wt % and 20 wt % relative to UHMWPE. In another aspect, the polypropylene is a powder and has a particle size between 100 μm and 2,500 μm. In another aspect, the method further comprises heating a UHMWPE/GO/PP composite during the mixing step. In another aspect, the method further comprises coating a UHMWPE powder with graphene or graphite oxide by combining the UHMWPE powder and the graphene or graphite oxide powder in a high shear mixer for more than 1 minutes and less than 60 minutes. In another aspect, the method further comprises adding a polypropylene powder to a graphene or graphite oxide coated UHMWPE powder and combining in a high shear mixer for more than 1 minutes and less than 60 minutes. In another aspect, the method further comprises placing a UHMWPE/GO/PP powder mix into an extruder to produce pellets for use in injection molding. In another aspect, the method further comprises extruding the composite in a cylinder at a temperature between 200° C. to 250° C.; with a melt temperature between 180° C. and 400° C. preferable 200° C. and 240° C.; and a screw speed between 60 to 300 rpm. In another aspect, at least one of a mechanical, electrical, or thermal physical property of the cementitious composite is enhanced with the addition of the graphene/graphite oxide. In another aspect, at least 95% of the graphene/graphite oxide flakes have a surface area to thickness ratio of a minimum of 300 Angstroms. In another aspect, the graphene/graphite oxide flake has primarily edge oxidation. In another aspect, the method further comprises obtaining graphene/graphite oxide flakes formed in a stirred media mill, and the stirred media mill is an Attrition mill or ball mill.

In another embodiment, the present invention includes a method of making a non-extrudable or poorly-extrudable polymer/graphene (G) and/or graphene oxide (GO) composite consists essentially of, or consists of: mixing a powder or pellets of the non-extrudable or poorly-extrudable polymer with between 0.01 wt % and 20 wt % graphene and/or graphene oxide under conditions in which the polymer powder or pellets and the graphene and/or graphene oxide are substantially mixed; and extruding or injection molding the composite into a shape, wherein the extrudable and injection moldable and preserves or enhances at least one mechanical, electrical, or thermal physical property relative to a compression molded version of non-extrudable or poorly-extrudable polymer/GO composite.

In another embodiment, the present invention includes an injection moldable/extrudable composite that preserves at least 80% or enhances the primary physical properties of compression molded polymer, the composite consists essentially of, or consists of, an Ultra High Molecular Weight Polyethylene (UHMWPE) and graphene/graphite oxide or graphene oxide. In one aspect, the composite further comprises polypropylene. In another aspect, the physical properties of a compression molded UHMWPE, and a resistivity less than 1011 Ohm-cm. In another aspect, the UHMWPE has a molecular weight between 500,000 and 16,000,000 Daltons. In another aspect, the UHMWPE has a molecular weight between 2,000,000 and 8,000,000 Daltons. In another aspect, the composite has a graphene oxide between 0.01 weight percent (wt %) and 20 wt % relative to UHMWPE. In another aspect, the composite has a graphene oxide between 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, or 10 wt % relative to UHMWPE. In another aspect, the composite has a polypropylene loading is between 0.1 wt % and 20 wt % relative to UHMWPE. In another aspect, the graphene/graphite oxide are graphene/graphite oxide flakes with a surface area to thickness ratio greater than 300 Angstroms, and thickness of less than 160 Angstroms, wherein the graphene flakes have no significant physical surface distortions, no significant epoxy functionalization, and have an oxidation level greater than 0.5% by mass.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited features, elements, components, groups, integers, and/or steps, but do not exclude the presence of other unstated features, elements, components, groups, integers and/or steps. In embodiments of any of the compositions and methods provided herein, "comprising" may be replaced with "consisting essentially of" or "consisting of". As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only. As used herein, the phrase "consisting essentially of" requires the specified features, elements, components, groups, integers, and/or steps, but do not exclude the presence of other unstated features, elements, components, groups, integers and/or steps as well as those that do not materially affect the basic and novel characteristic(s) and/or function of the claimed invention.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

Patent Construction material obtained from recycled polyolefins containing other polymers U.S. Pat. No. 7,231,084.

Ultra high molecular weight polyolefin fiber composite matrix, and process for the manufacture thereof U.S. Pat. No. 6,172,163.

Patent Application Additive Coated Particles for Low Cost High Performance Materials; Low-Cost by Garmor.

High-Performance Composite Bipolar Plate by Garmor; and Engineered Composite Structure Using Graphene Oxide by Garmor.

Roger S. Porter et al (Polymer, 35, 23, 1994, p. 4979-84), Property Opportunities with Polyolefins. A Review Preparations and applications of High Stiffness and Strength by Uniaxial Draw.

What is claimed is:

1. An injection-moldable or extrudable composite comprising;
    a powder or pellets of a polymer comprising ultra-high molecular weight polyethylene (UHMWPE) and one or more substances selected from cross-linked polyethylene (PEX), linear low-density polyethylene (LLDPE), low-density polyethylene (LDPE), medium-density polyethylene (MDPE), para-aramid fibers, or polyoxazole fibers; and
    graphene/graphite oxide or graphene oxide;
    wherein the composite enhances or preserves at least 80% of primary physical properties of a compression-molded version of the polymer.

2. The composite of claim 1, wherein physical properties of a compression-molded UHMWPE comprise a resistivity less than 1011 ohm-cm.

3. The composite of claim 1, wherein the UHMWPE has a molecular weight between 500,000 and 16,000,000 daltons or between 2,000,000 and 8,000,000 daltons.

4. The composite of claim 1, wherein the composite has a graphene oxide loading of 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, 10 wt %, 11 wt %, 12 wt %, 13 wt %, 14 wt %, 15 wt %, 16 wt %, 17 wt %, 18 wt %, 19 wt %, or 20 wt % relative to the UHMWPE; or
    the composite has a polypropylene loading of 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, 10 wt %, 11 wt %, 12 wt %, 13 wt %, 14 wt %, 15 wt %, 16 wt %, 17 wt %, 18 wt %, 19 wt %, or 20 wt % relative to the UHMWPE.

5. The composite of claim 1, wherein the graphene/graphite oxide comprises graphene/graphite oxide flakes with a surface area to thickness ratio greater than 300 angstroms, and a thickness of less than 160 angstroms, wherein the graphene flakes have no significant physical surface distortions, no significant epoxy functionalization, and an oxidation level greater than 0.5% by mass; or
  wherein at least 95% of the graphene/graphite oxide comprises graphene/graphite oxide flakes with a thickness of about 0.8 to 20 nm.

6. The composite of claim 1, wherein at least one of: a mechanical, an electrical, or a thermal physical property of the polymer is enhanced or sustained with addition of the graphene/graphite oxide or graphene oxide when compared to the polymer without the graphene/graphite oxide or graphene oxide.

7. The composite of claim 1, wherein UHMWPE comprises a powder with a particle size between 15 μm and 1,000 μm; or the polypropylene comprises a powder with a particle size between 100 μm and 2,500 μm.

8. A method of making an extrudable and injection-moldable comprising:
  mixing a powder or pellets of a polymer comprising ultra-high molecular weight polyethylene (UHMWPE) and one or more other substances with between 0.01 wt % and 20 wt % graphene and/or graphene oxide, wherein the one or more other substances comprise at least one of cross-linked polyethylene (PEX), linear low-density polyethylene (LLDPE), low-density polyethylene (LDPE), medium-density polyethylene (MDPE), para-aramid fibers, or polyoxazole fibers, and wherein the composite preserves or enhances at least one mechanical, electrical, or thermal physical property relative to a compression-molded composite of the polymer and the graphene oxide.

9. The method of claim 8, wherein physical properties of a polymer comprises a resistivity less than 1011 ohm-cm.

10. The method of claim 8, wherein the UHMWPE has a molecular weight between 500,000 and 16,000,000 daltons or between 2,000,000 and 8,000,000 daltons.

11. The method of claim 8, wherein the composite has a graphene oxide loading of 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, 10 wt %, 11 wt %, 12 wt %, 13 wt %, 14 wt %, 15 wt %, 16 wt %, 17 wt %, 18 wt %, 19 wt %, or 20 wt % relative to the UHMWPE; or
  the composite has a polypropylene loading of 0.1 wt %, 0.5 wt %, 1.0 wt %, 1.25 wt %, 1.5 wt %, 1.75 wt %, 2.0 wt %, 2.25 w %, 2.5 w %, 2.75 wt %, 3.0 wt %, 3.25 wt %, 3.5 wt %, 3.75 wt %, 4.0 wt %, 4.25 wt %, 4.5 wt %, 4.75 wt %, 5.0 wt %, 6.0 wt %, 7.0 wt %, 8.0 wt %, 9.0 wt %, 10 wt %, 11 wt %, 12 wt %, 13 wt %, 14 wt %, 15 wt %, 16 wt %, 17 wt %, 18 wt %, 19 wt %, or 20 wt % relative to the UHMWPE.

12. The method of claim 8, wherein the graphene/graphite oxide are graphene/graphite oxide flakes with a surface area to thickness ratio greater than 300 angstroms, and thickness of less than 160 angstroms, wherein the graphene/graphite oxide flakes have no significant physical surface distortions, no significant epoxy functionalization, and have an oxidation level greater than 0.5% by mass; or wherein at least 95% of the graphene/graphite oxide comprises graphene/graphite oxide flakes with a thickness of about 0.8 to 20 nm.

13. The method of claim 8, or the UHMWPE comprises a powder with a particle size between 15 μm and 1,000 μm, or the polypropylene comprises a powder with a particle size between 100 μm and 2,500 μm.

14. The method of claim 8, further comprising at least one of:
  heating a composite of UHMWPE, graphene oxide, and polypropylene during the mixing step;
  coating a UHMWPE powder with graphene or graphite oxide by combining the UHMWPE powder and the graphene or graphite oxide powder in a high shear mixer for more than 1 minute and less than 60 minutes;
  adding a polypropylene powder to a graphene or graphite oxide coated UHMWPE powder and combining in a high shear mixer for more than 1 minute and less than 60 minutes;
  placing a mix of UHMWPE, graphene oxide, and polypropylene powder into an extruder to produce pellets for use in injection molding;
  obtaining graphene/graphite oxide flakes formed in a stirred media mill, wherein the stirred media mill is an Attrition mill or ball mill; or
  extruding the composite in a cylinder at a temperature between 200° C. and 250° C.; with a melt temperature between 180° C. and 400° C. or between 200° C. and 240° C.; and a screw speed between 60 to 300 rpm.

15. The method of claim 8, wherein at least one of a mechanical, electrical, or thermal physical property of the composite is enhanced with the addition of the graphene/graphite oxide.

16. The method of claim 8, wherein the graphene/graphite oxide comprises graphene/graphite oxide flakes and at least 95% of the graphene/graphite oxide flakes have a surface area to thickness ratio of a minimum of 300 angstroms; or wherein the graphene/graphite oxide flake has primarily edge oxidation.

17. The method of claim 8 further comprising:
  extruding or injection molding the composite into a shape.

18. An injection-moldable or extrudable composite comprising:
  an Ultra High Molecular Weight Polyethylene (UHMWPE) and one or more substances selected from cross-linked polyethylene (PEX), linear low-density polyethylene (LLDPE), low-density polyethylene (LDPE), medium-density polyethylene (MDPE), para-aramid fibers, and/or polyoxazole fibers; and
  graphene/graphite oxide or graphene oxide;
  wherein the composite enhances or preserves at least 80% of primary physical properties of a compression-molded version of the polymer.

\* \* \* \* \*